United States Patent [19]

Kuckens et al.

[11] Patent Number: 4,518,105
[45] Date of Patent: May 21, 1985

[54] METHOD OF AND DEVICE FOR DISPENSING VISCOUS CONCENTRATES OF VARIABLE VISCOSITY IN ACCURATELY METERED QUANTITIES OF VARIABLE VOLUME

[75] Inventors: Alexander Kuckens, Reinfeld; Horst Kohl, Bad Oldesloe, both of Fed. Rep. of Germany

[73] Assignee: DAGMA Deutsche Automaten-und Getrankemaschinen GmbH & Co., Ltd., Reinfeld, Fed. Rep. of Germany

[21] Appl. No.: 361,899

[22] Filed: Mar. 25, 1982

[30] Foreign Application Priority Data

Mar. 26, 1981 [DE] Fed. Rep. of Germany ....... 3112024

[51] Int. Cl.³ .................................................. B65D 37/00
[52] U.S. Cl. .................................. 222/207; 222/333
[58] Field of Search ................. 222/1, 207, 209, 214, 222/333; 417/417, 478

[56] References Cited

U.S. PATENT DOCUMENTS

| | | | |
|---|---|---|---|
| 2,299,572 | 10/1942 | Estenes | 222/207 |
| 2,554,570 | 5/1951 | Harvey | 222/207 |
| 2,824,672 | 2/1958 | Wersching | 222/207 |
| 3,074,351 | 1/1963 | Foster | 417/478 |
| 3,602,387 | 8/1971 | Patnaude et al. | 417/478 |
| 3,828,985 | 8/1974 | Schindler | 222/209 |
| 3,907,167 | 9/1975 | Zanardo | 222/57 |
| 3,987,775 | 10/1976 | O'Connor | 417/478 |
| 4,030,640 | 6/1977 | Citrin et al. | 222/209 |
| 4,378,079 | 3/1983 | Kuckens | 222/333 |
| 4,393,982 | 7/1983 | Kuckens | 222/214 |

FOREIGN PATENT DOCUMENTS

| | | | |
|---|---|---|---|
| 1459735 | 11/1966 | France | 222/207 |
| 2356912 | 1/1978 | France | |

Primary Examiner—H. Grant Skaggs
Attorney, Agent, or Firm—Willian Brinks Olds Hofer Gilson & Lione Ltd.

[57] ABSTRACT

For the purpose of dispensing viscous concentrates, particularly or organic substances, a cylindrical pumping space is defined by a hollow cylindrical body and two non-return valves associated with the ends of said body, said pumping space being supported in a radial direction at least during each pumping stroke in such a way that changes in volume are only possible in an axial direction in relation to said pumping space. The metering accuracy capable of being attained by means of the device of the invention makes it possible, with the device being of simple and low-cost construction, to dispense extremely small quantities of a concentrate with the device being operated at a pumping cycle frequency which corresponds to the frequency of the power mains by means of which an electromagnetic actuating coil is operated.

9 Claims, 4 Drawing Figures

METHOD OF AND DEVICE FOR DISPENSING VISCOUS CONCENTRATES OF VARIABLE VISCOSITY IN ACCURATELY METERED QUANTITIES OF VARIABLE VOLUME

This invention relates to a method of and a device for dispensing viscous concentrates of variable viscosity in accurately metered quantities of variable volume in which cyclic variations of the pumping volume of a hollow body made of a flexible or elastically deformable material cause said concentrate to be drawn in from the storage volume of a container via a non-return valve and to be discharged on the output side via a second non-return valve.

There have been known a variety of metering pumps in the form of discharging sections provided with two non-return valves, one of which functions as an inlet valve, the other one functioning as an outlet valve. For example, there has been disclosed in British Patent Specification No. 827,778 a metering pump in which the discharge section is formed by a flexible tube which is adapted to be closed by the application of a radial squeezing pressure by means of an actuating device and which tends again to assume its full open cross-section upon said actuating device being released. Opening of the inlet valve or the outlet valve, respectively, is effected by pressure changes caused in said discharge portion. Such a device is not only hard to manipulate properly but permits only a relatively inaccurate metering effect to be obtained. Therefore, such devices may be considered suitable for use with soap dispensers and the like in which metering accuracy is not at a premium. Besides, the means serving to operate said discharge section are extremely complicated and expensive.

It has further been known to provide a discharging section with a radially outwardly projecting bellows-like fold which is adapted to be compressed in an axial direction between a pair of plate-shaped actuating elements so as to serve the function of a metering pump. In this case it is also possible to construct the discharging section as a rubber bellows which has associated therewith suitable beak-like rubber valves forming non-return valves (cf. U.S. Pat. No. 2,554,570). This known device also occupies considerable space and is, therefore, not suitable for installation in vending machines or the like. The metering volume of this known device is also relatively inaccurate so that it is extremely difficult to ensure accurate metering.

Where it is desired to dispense metered quantities of certain highly viscous concentrates, an extremely accurate metering operation is necessary. In view of the fact that in certain applications, such as beverage vending machines, extremely little space is available for mechanical equipment, it is necessary to provide a metering device which is of as compact design as possible. A particularly serious problem arises from the fact that concentrates of perishable organic substances pose great difficulties as regards the maintenance of hygienic conditions, particularly in cases in which the metering device and/or accessories thereof may be contaminated by drops of such substances. If all hygienic requirements are to be met, the necessary maintenance operations and frequent cleaning of component parts prove to be extremely difficult and time-consuming, it being necessary to provide for constant supervision of such operations.

In the prior-art metering devices comprising a peristaltic pump or a similar tube-shaped discharging section, only a relatively small restoring force is produced upon the elastic tube material being subjected to small amounts of deformation. The restoring force is not increased sufficiently unless a major amount of deformation is caused. However, the magnitude of the restoring force also affects the accurate reproduceability of the deformation and thus the accuracy of the metering operation. Therefore, these known devices are only adapted to dispense relatively large volumes of the concentrate, and the frequency with which metering cycles can be performed is relatively low. The term "relatively large volumes" is understood to mean, for example, volumetric quantities of 0.4 cubic centimeters. Nor is it possible to prestress or bias a filled flexible tube section in its initial position because it is necessary to thread the tube sections into an actuating device such as a peristaltic pump, it being necessary to avoid any deformation in order to prevent any drops of liquid.

Another important factor tending to impair the metering accuracy of such known devices resides in the fact that, during a decrease in the pumping volume, the tube-shaped discharging section is subjected to uncontrollable additional deformation caused by the increased pressure occurring whithin said section. Such uncontrollable variations may only be tolerated where a relatively large metering volume is discharged during each cycle so that the influence of such variations remains small.

In view of the foregoing, it is an object of this invention to improve the method described above as well as the device for practicing said method in such a way as to avoid the disadvantages thereof and to enable even extremely small quantities of a concentrate to be dispensed in an extremely accurate manner and at a high cycling frequency. It is a further object of this invention to provide a device for practicing the method which is of extremely compact construction so as to permit it to be easily accommodated in a small space, for example, in a beverage vending machine, or to permit the device to be installed in existing vending machines.

This object is attained by the provision of the method of the present invention. The method of the invention is capable of being practiced by means of a device having the features of the present invention.

According to the invention, a pumping effect is produced by decreasing in an axial direction a cylindrical pumping volume which is supported in a shape-maintaining manner during the volume reducing operation with the result that uncontrollable deformation due to the increasing pumping pressure and changes in the metering volume are avoided. In this manner it is possible to provide an extremely high degree of precision of the metering operation even in cases in which extremely small quantities are dispensed per metering cycle. The axial compression of the cylindrical metering volume makes it possible for the hollow cylindrical body defining the pumping volume to be subjected in its initial position to a presettable axial bias in the sense of a increase in said volume. This results in the provision of sufficiently large restoring forces even with changes in volume of minimum magnitude. Moreover, this axial compression of the pumping volume in conjunction with the extremely high accuracy capable of attainment even with extremely small metering volumes makes it possible to provide a frequency of metering cycles which is in agreement with the power mains frequency, i.e. a frequency of 50 to 60 Hz. This high cycling frequency and the smallness of the quantities capable of being metered make it possible to vary the total quantity to be discharged to be selected within a large range of adjustment simply by suitably controlling the number of metering pulses per unit time. This method of control can be implemented in an extremely simple and reliable manner with mains-frequency controlled devices.

Despite the bias which exists in the inoperative position of the pumping volume, the discharging section can be easily and reliably threaded into the actuating means without drops of liquid being dispensed in an undesired manner. At the same time the hygienic problems are completely avoided which might otherwise be caused by contamination of the device. In addition, the arrangement just described is improved considerably by the fact that all components which are of importance as regards reliable functioning of the device are enclosed in a rigid guiding tube which is either permanently or releasably connected to a container for shipping, storage and dispensing of the liquid, said container preferably being a single-use product.

The high cycling frequency of the device thus permits the liquid to be dispensed in the form of an almost continuous flow or stream with the aid of a train of rapidly repeated metering cycles with the length of said train being capable of being adjusted to suit requirements.

The sleeve-shaped body of the device need only be of flexible nature, it being possible, by the addition of suitable elements such as spring elements or the like, to provide for the necessary bias and restoring action. In a preferred embodiment, however, the sleeve body is made of a shape-retaining elastic material and secured to rigid hub-shaped bodies of said non-return valves.

The small dimensions of the dispensing section makes it possible to install the device in a vending machine in which extremely little space is available. An additional advantage of the device of the invention makes it possible to modify existing metering devices by the addition of an electromagnetic annular coil for the purpose of substituting a quantity controlled or volume controlled metering method for the time controlled metering method described where time controlled metering would result in undesirable fluctuations of accuracy due to changes in the viscosity of the liquid. The metering accuracy of the device of the invention is not affected by such variations in consistency.

The invention and further particulars will be described more specifically hereinafter with reference to a preferred embodiment shown in the drawings, in which.

Preferably the device of the invention is manufactured in the form of a single-use container which is adapted to store, transport and dispense metered quantities of a liquid. Preferably, the dispensing section is permanently secured to the container during manufacture thereof and is discarded together with the container after use. Thus, the container constitutes a mass-produced item.

Said container may comprise an external envelope and an interior flexible bag adapted to contain the liquid and to collapse as liquid is being withdrawn. With this construction, it is not necessary to introduce air into the container to permit liquid to be dispensed. However, it would also be possible to provide an essentially rigid container with which ventilating means are associated which are adapted to be actuated for the purpose of dispensing liquid.

It should be understood that the container is preferably intended for the reception, storage and transportation as well as the dispensing of organic concentrates.

Figure 1:
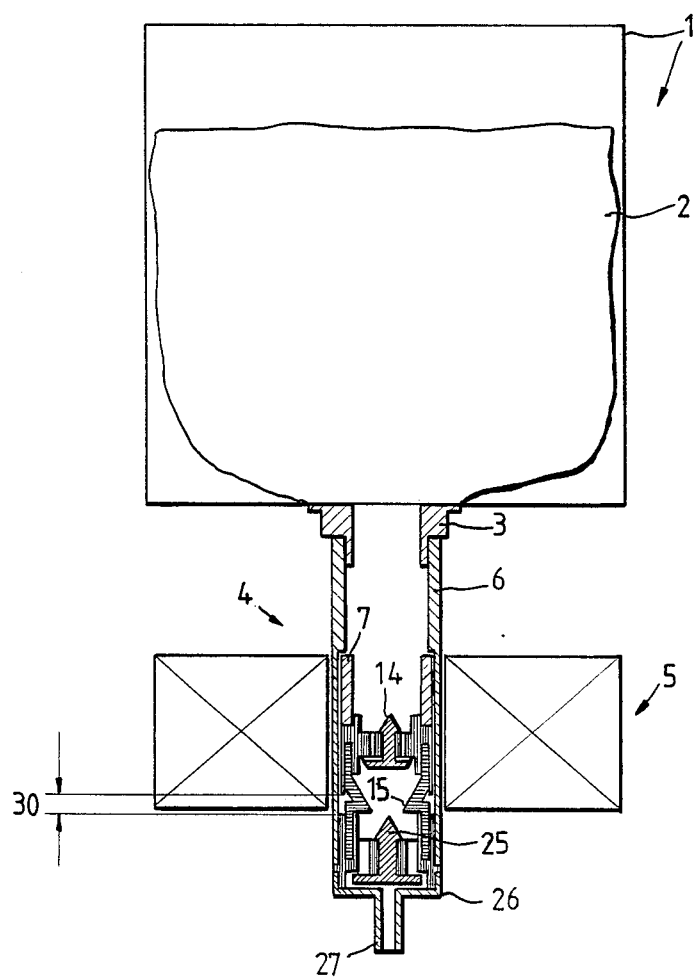
FIG. 1 is an axial cross-sectional view of a container for the storage, trasportation and dispensing of a liquid, the container being provided with a dispensing section according to the invention.

In the embodiment shown in FIG. 1 the container comprises an external envelope 1 and a flexible and collapsible liquid-receiving container 2 which latter is provided with a mouthpiece 3 to which the dispensing section 4 is preferably permanently attached. In FIG. 1 the container is shown in the inverted position in which it is held when it is intended to dispense metered quantities of a liquid. In this position, the dispensing section 6 extends through the central aperture of an electromagnetic annular coil 5 which may, for example, be fixedly installed in an automatic beverage vending machine. The electromagnetic annular coil 5 is connected to suitable control means which makes it possible, for example, to operate the electromagnetic annular coil 5 at the power mains frequency with the number of oscilations coil 5 is desired to follow being adjusted with the aid of said control means.

Figure 2:
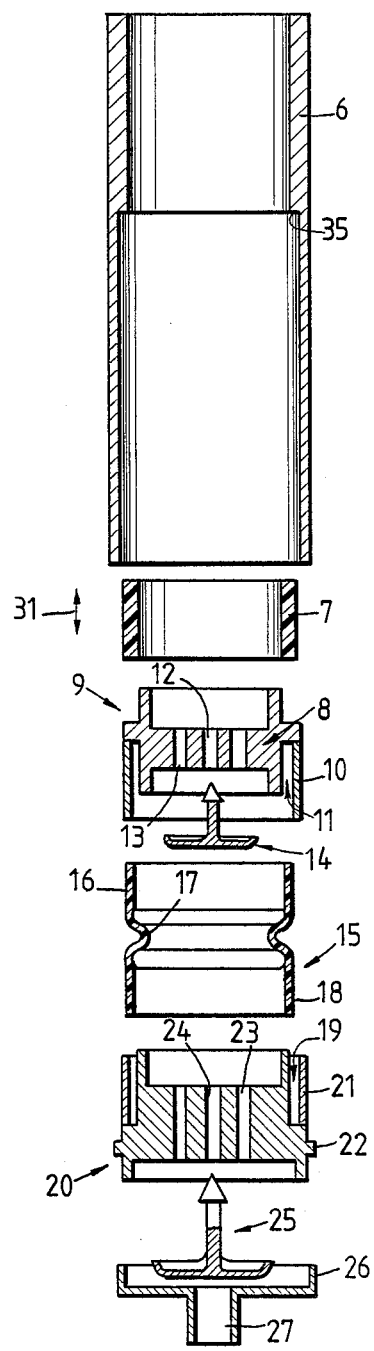
FIG. 2 is an enlarged exploded cross-sectional view of the component parts of the dispensing section.

Dispensing section 4 comprises a rigid tubular guide member 6 made of a plastic material, the upper end of which is permanently secured to mouthpiece 3 of the container. As shown in FIG. 2, tubular guide member 6 is provided with a free cross section through a major part of its length forming an enlarged portion extending downwardly from an annular shoulder 35. The tubular guide member 6 has associated therewith a rigid cover member 26 at its lower end, this cover member being provided with a central discharge spigot 27. In the embodiment shown the two members 6 and 26 of the tubular guide member are interconnected by a hub-shaped valve body 20 which is provided with an external annular flange 22 serving as an abutment up to which the tubular guide member and the cover member 26 may be slid over the valve body so as to hold the members in position. In this arrangement, the hub-shaped valve body 20 is rigidly connected to both the tubular guide member 6 and the cover member 26.

Another similar hub-shaped valve body 8 is received with clearance by the larger-diameter portion of guide member 6 so as to be capable of freely moving in an axial direction within guide member 6. A spigot-shaped terminal portion of valve body 8 made of a plastic material facing container 1 in an upward direction has attached thereto a magnetizable sleeve member 7 forming an annular armature, the lower annular shoulder of said sleeve member bearing against shoulder 9 of valve body 8. Thus, valve body 8 and annular armature 7 constitute a rigid unit which is axially movable upwardly and downwardly within guide member 6 as indicated by the double-headed arrow 31.

The mutually facing ends of valve bodies 8 and 20 are provided with receiving and mounting portions 10, 11 and 19, 21, respectively, for the sleeve-shaped end portions 16 and 18 of a hollow cylindrical body 15. In the embodiment shown, body 15 is made of an elastic material so that it also serves the function of an elastic spring element. As shown in FIG. 2, body 15 is provided with terminal portions 16 and 18 of greater wall thickness serving to mount the two valve bodies 8 and 20 and is also provided with a radially inwardly projecting fold or bead 17 of smaller thickness. Body 15 connecting the hub-shaped valve bodies 8 and 20 defines a predetermined metering volume between the valve bodies. The initial capacity of this volume is determined by the restoring action of body 15 in conjunction with the internal shoulder 35 of tubular guide member 6 on which the annular upper end face of annular armature 7 bears in the rest position.

In the embodiment shown, each of the valve bodies 8 and 20 is provided with a central bore 12 and 24, respectively, into which there may be spring-fitted a shaft portion of a valve element 14 or 25, respectively, said valve elements being of mushroom shape and made of an elastic material. A tapered enlargement provided on the free end of each mushroom-shaped portion serves to lock the valve element to its associated hub-shaped valve body. The lip-shaped peripheral edge of the dish-shaped head portion of valve element 14 or valve element 25, respectively, is caused by the variable pressure to which it is subjected to bear sealingly against the adjacent inner end face of the respective hub-shaped valve body 8 or 20. The inner portions of said valve bodies are provided with a plurality of passages 13 and 23, respectively, each plurality forming a circular arrangement, said passages permitting liquid to enter the metering space and to be discharged therefrom, respectively. Under static conditions, the elastic bias produced by the material of the mushroom-shaped valve elements 14 and 25 is sufficient to prevent liquid from flowing through passages 13 and 23. Only with pressure variations exceeding such static conditions will the lip-shaped peripheral edges of the dish-shaped head portions of the valve elements be lifted off the central end faces of said hub-shaped valve bodies 8 and 20 so as to permit liquid to flow through said passages.

The stroke length of the assembly formed by valve body 8 and annular armature 7 in an upward direction is limited by the internal shoulder 35 of tubular guide member 6. In a downward direction the stroke length of said assembly is limited by the fact that during such downward motion the lower edge of portion 10 of the hub-shaped valve body 8 comes into contact with the annular upper edge of portion 21 of hub-shaped valve body 20. Without the design of this arrangement being changed, it is possible by suitably selecting the length of portions 10 and 21 easily and accurately to adjust the stroke length 30 (FIG. 1) of the movable assembly 7, 8. As valve body 8 approaches valve body 20, portions 10 and 21 thereof enclose the hollow cylindrical body and support it from the outside in such a manner that it cannot change its shape, the result being that body 15 cannot be expanded in a radial direction.

FIG. 1 shows the component parts of the embodiment just described approximately in their actual size, the stroke length of this preferred embodiment being a little smaller than shown at 30 in FIG. 1. The liquid volume dispensed through spigot 27 is determined by the number of pumping strokes occurring at the power mains frequency. Therefore, this volume can be easily adjusted because the individual quantities discharged during each pumping stroke can be adjusted in an extremely accurate manner even in the case of very small increments. Within the dispensing section 4 the liquid is hermetically sealed so as to be protected against the action of atmospheric oxygen. It is seen that the arrangement described is capable of being manufactured in a simple manner and at low cost, that it operates in a very reliable manner, that its manipulation is extremely simple and safe, and that no contamination of components located in the vicinity of the device is possible.

The stroke length may also be limited by means of stop members of different construction which are provided, for example, on the tubular guide member.

In order to avoid radial deformation of the hollow cylindrical body in the vicinity of the radially inwardly projecting bead 17, it may be of advantage to provide the or each bead in the area of its internally projecting ridge with a rigid supporting ring.

More specifically, it may be of particular advantage to give the ridge of the bead a helical shape. In this case it is possible to provide in association with said ridge a supporting element in the form of a helically extending spring element which is adapted to be compressed in an axial direction only, said spring element serving the additional function of axially biassing the hollow cylindrical body 15. In the latter case body 15 need not be of a shape-elastic nature if it is made of a material having a sufficient degree of flexibility.

Under certain conditions it is possible to dispense with the non-return valve 25 provided on the discharge end of the device.

In this case the non-return valve at the exit of the pumping volume is replaced by a discharge spigot which is in unobstructed connexion with the pumping space. The inner diameter and the length of such a discharge spigot are so selected that the inner friction and the surface tension of the concentrate present in the discharge spigot suffice to retain the concentrate column in its axial position within the discharge spigot with the pumping volume remaining unchanged or being increased. The pumping volume will remain constant as long as the non-return valve at the entering end of the device is closed. With the pumping volume being increased, concentrate will be withdrawn from the container and transferred into the pumping space.

In a practical embodiment of this modified device of the invention, the inner diameter of the pumping space amounted to between 8 and 12 mm. The stroke length was adapted to be adjusted between 1 and 2 mm. The stroking frequency amounted to 50 cycles per second, but it was possible to vary this frequency between 10 and 100 cycles per second without the operation of the device being impaired. The device was tested with liquids having a viscosity ranging from 1 to 100 centipoise units. The non-return valve located on the entry side was provided as passages with slots arranged on a semicircle and adapted to be covered by a small valve plate. It was found that no dripping of concentrate had to be expected with a length between 10 and 40 mm of the discharge spigot replacing the exit valve and with an inner diameter of said spigot between 1 and 3 mm.

Without the flexible body or bellows 15 being supported by the corset-like arrangement, said bellows will be subject to an irregular formation of externally curved portions, this phenomenon impairing the accuracy of the metering operation. In contrast to this, the corset-like supporting means of the invention makes it possible to maintain volumetric tolerances of hardly measurable magnitude.

Figure 3:
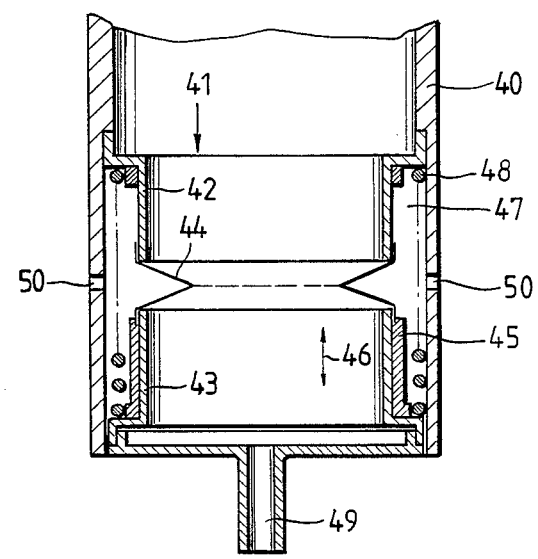
FIG. 3 is an enlarged cross-sectional view of a modified embodiment of the dispensing section.

FIG. 3 shows a modified embodiment of the component parts defining the pumping space. Mounted in a cylindrical housing 40, the upper end of which is adapted to be connected to the container for the concentrate, is an upper sleeve member 42 which is provided with an outwardly projecting flange at its upper end. A corresponding lower sleeve member 43 is provided in the lower end of housing 40 and rigidly attached to a cover member having an outlet spigot 49. In the example shown, it is assumed that the lower sleeve member 43 is guided with clearance in the lower end of housing 40. Also the lower sleeve member 43 is provided with an outwardly projecting flange. Between the lower portion of housing 40 and the two approximately aligned spigot sections 42 and 43 which are made of a rigid material such as a plastic material there is provided an annular space 47. Disposed in this annular space is a spreading or biasing spring 48 the ends of which bear against the flanges of sleeve members 42 and 43, said spring tending to hold the two sleeve members in their spread-apart position shown in FIG. 3. In the embodiment shown the lower spigot is connected to an annular armature 45 which is adapted to be actuated in such a manner by the electromagnetic operating means (not shown) that the lower spigot 43 can be raised until it bears against the upper spigot 42 for the performance of a pumping stroke. The two opposing ends of the two spigots are sealingly interconnected by a bellows member 44 which essentially applies no forces to the spigots. With the two spigots 42 and 43 being brought into their proximate position, the fold 44 is practically closed completely.

In order to prevent air from being compressed in the annular space 47 in synchronism with the pumping strokes, said annular space is ventilated to the external atmosphere via slots or drilled holes 50 which should be arranged at the minimum possible distance from the final position attained during a pumping stroke so as to provide a flow path of minimum length for the air displaced as the volume of annular space 47 is varied. Provided in the vicinity of the upper flange of spigot 42 is the inlet valve (not shown) of the pumping chamber, it being possible to provide an inlet valve which resembles the embodiment described earlier. In FIG. 3 the pumping motion of the lower sleeve member 43 is indicated by the double-headed arrow 46. It would also be possible to provide an arrangement in which the two sleeve members are adapted to move towards and away from one another. The embodiment shown in FIG. 3 affords the advantage that no concentrate can enter the annular space 47. The spigot 49 can be constructed in such a way that it is not necessary to associate a non-return valve to the outlet.

Figure 4:
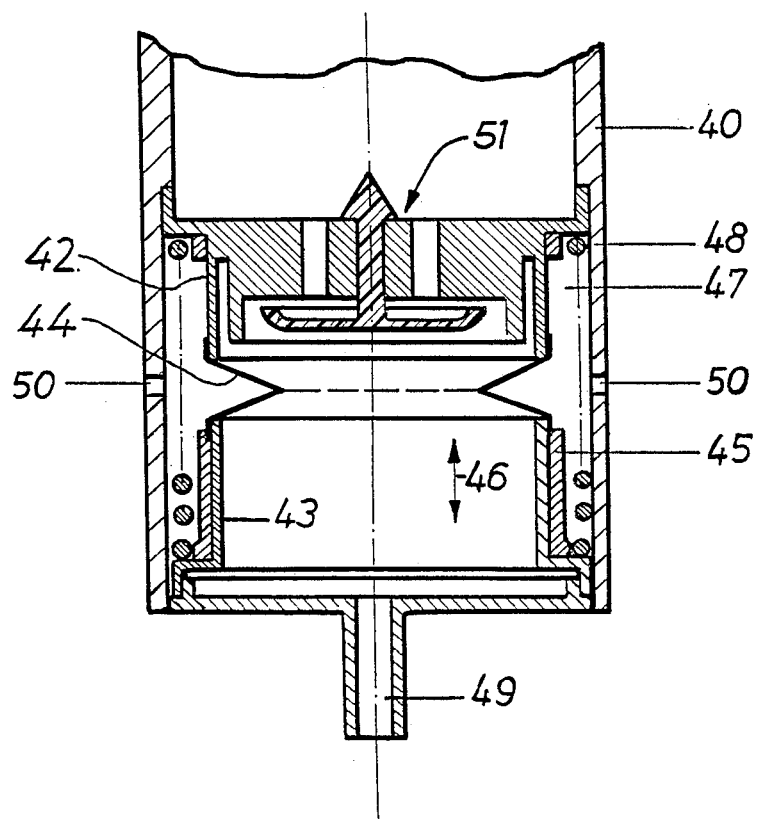
FIG. 4 is another view of the modified embodiment of FIG. 3 showing a non-return inlet valve.

FIG. 4 shows the same modified embodiment as FIG. 3 but also shows a non-return inlet valve 51 in combination with the spring 48. The valve 51 is exactly like the non-return inlet valve of FIG. 2.

It will be understood that such an arrangement which is operable independently of the elastic restoring force of a rubber bellows is capable of metering almost paste-like media which are not adapted to be metered by means of the normally available restoring force provided by a shape-retaining elastic body. In this case it will be necessary to provide the magnetic forces in a suitable manner. The spring force can then be determined in an analogous manner.

The metering device of the invention is also suitable for fluids other than syrups and the like. Particularly in the case of perishable fluids, the pump elements employed in the single-use unit afford the advantage that it is possible by suitable manufacturing methods to limit the useful life, for example of the diaphragm, with the result that illegal refilling of the container will cause rapid deterioration of the diaphragm so as to render the device useless. This is an effective method of preventing hygienic problems from arising.

What is claimed is:

1. An improved device for dispensing a viscous concentrate of variable viscosity of the type in which a dispensing section is adapted to be connected to a container for the concentrate and to be inserted into an annular actuating means having an actuating element which axially acts on a section of flexible elastic material forming a pumping volume, to cyclically reduce and expand the volume, the pumping volume containing a non-return valve with a rigid valve body at least at an inlet side and an outlet on another opposite outlet side, wherein the improvement comprises:

the section forming the pumping volume comprises a hollow cylindrical body arranged in the dispensing section insertable into the actuating means and is small as compared to the respective quantities to be dispensed;

a radially shape-retaining hollow cylindrical member adapted, at least during the volume reducing phase, to radially outwardly support the hollow cylindrical body against deformation;

biasing means by which the hollow cylindrical body in the initial position of the maximum pumping volume is biased with a predetermined force in the sense of increasing said pumping volume; and the hollow cylindrical body has at least one radially inwardly pointing annular fold and wherein the hollow cylindrical member radially supporting the hollow cylindrical body is formed by two rigid sleeve portions, one of which being movable as a unit with the actuating element in axial direction relative to the other one.

2. A device as claimed in claim 1, wherein the sleeve portions are adapted to serve as cooperating stops for limiting the axial compressing movement of the hollow cylindrical body.

3. A device as claimed in claim 2 wherein the axially movable rigid sleeve portion and the actuating element form a unit of axial movement with the rigid valve body of the non-return valve arranged at the inlet side.

4. A device as claimed in claim 3 further including a rigid guide tube within which the outlet end of the hollow cylindrical body and the associated sleeve portion are axially immovably arranged and within which the inlet end of the hollow cylindrical body is axially slidably guided by the axially movable rigid sleeve portion and the actuating element.

5. A device as claimed in claim 4 wherein the actuating element is in the form of an annular armature of an electromagnetic actuating means which is cyclically movable in the guide tube at an electrical power line frequency of between 50 and 60 cycles per second.

6. A device as claimed in claim 5, further including a spring positioned between the ends of the hollow cylindrical body for holding the body in an initial position in which it has its greatest pumping volume under stretching tension.

7. A device as claimed in claim 6, wherein the spring is arranged in an annular space between the guide tube and the hollow cylindrical body and wherein the guide tube contains at least one aeration opening open toward the outer atmosphere.

8. A device as claimed in claim 7 wherein the hollow cylindrical body has at least one radially inwardly pointing fold and further including an axially resilient helical spring attached to the fold for providing support to prevent radial deformation of the hollow cylindrical body in the proximity the fold.

9. A device as claimed in claim 8, wherein the outlet of the pumping volume is in free connection with a discharge spigot of such internal diameter and such axial length that the inner friction and the surface tension of the concentrate are sufficient for the discharge spigot to retain the concentrate column in an axially unchanged position in the discharge spigot, with the pumping volume remaining unchanged and also with the pumping volume being increased.

* * * * *

UNITED STATES PATENT AND TRADEMARK OFFICE
CERTIFICATE OF CORRECTION

PATENT NO. : 4,518,105
DATED : May 21, 1985
INVENTOR(S) : Alexander Kuckens and Horst Kohl It is certified that error appears in the above-identified patent and that said Letters Patent is hereby corrected as shown below:

<u>IN THE ABSTRACT</u>

In line 2, please delete "or" and substitute therefor --of--.

In column 2, line 26, please delete "whithin" and substitute therefor --within--;

In column 3, line 58, please delete "and";

In column 3, line 60, please delete "." and substitute therefor --; and--;

In column 4, line 27, please delete "makes" and substitute therefor --make--.

In column 6, line 22, please delete "biassing" and substitute therefor --biasing--.

UNITED STATES PATENT AND TRADEMARK OFFICE
CERTIFICATE OF CORRECTION

PATENT NO. : 4,518,105
DATED     : May 21, 1985
INVENTOR(S) : Alexander Kuckens and Horst Kohl It is certified that error appears in the above-identified patent and that said Letters Patent is hereby corrected as shown below:

In column 6, line 31, please delete "connexion" and substitute therefor --connection--.

Signed and Sealed this

Twenty-third Day of September 1986

[SEAL]

Attest:

DONALD J. QUIGG

Attesting Officer

Commissioner of Patents and Trademarks